United States Patent
Zeh et al.

(10) Patent No.: US 7,340,158 B2
(45) Date of Patent: Mar. 4, 2008

(54) METHOD AND CIRCUIT CONFIGURATION FOR CONTROLLING A POLYPHASE BRUSHLESS ELECTRIC MOTOR

(75) Inventors: Stefan Zeh, Wangen (DE); Martin Weinmann, Bad Waldsee (DE); Alexander Müller, Bad Waldsee-Reute (DE); Valeriu Olarescu, Wangen (DE)

(73) Assignee: Diehl Ako Stiftung & Co. KG, Wangen (DE)

( * ) Notice: Subject to any disclaimer, the term of this patent is extended or adjusted under 35 U.S.C. 154(b) by 0 days.

(21) Appl. No.: 11/347,950

(22) Filed: Feb. 6, 2006

(65) Prior Publication Data
US 2006/0177204 A1    Aug. 10, 2006

(30) Foreign Application Priority Data
Feb. 5, 2005    (DE) .................. 10 2005 005 404
Jun. 18, 2005   (DE) .................. 10 2005 028 344

(51) Int. Cl.
*H02P 6/00*    (2006.01)
(52) U.S. Cl. .............. 388/804; 388/803; 388/800; 388/805; 318/254; 318/138; 318/439
(58) Field of Classification Search ............... 318/254, 318/138, 439; 388/804, 806, 803, 800, 805
See application file for complete search history.

(56) References Cited

U.S. PATENT DOCUMENTS 4,757,241 A * 7/1988 Young .................. 318/254
5,256,949 A * 10/1993 Reichard et al. ............ 318/254
5,287,288 A * 2/1994 Brennen et al. ............. 702/58
5,351,178 A * 9/1994 Brennen et al. ............. 363/40
5,355,025 A * 10/1994 Moran et al. ................ 307/105

(Continued)

FOREIGN PATENT DOCUMENTS

DE    196 28 585 C2    1/1998

(Continued)

OTHER PUBLICATIONS

Francesco Parasility et al.: "Low Cost Phase Current Sensing in DSP Based AC Drives", XP-002412877, University of L'Aquila, Department of Electrical Engineering, pp. 1284-1289, © 1999 IEEE.

(Continued)

*Primary Examiner*—Rita Leykin
(74) *Attorney, Agent, or Firm*—Laurence A. Greenberg; Werner H. Stemer; Ralph E. Locher (57) ABSTRACT

A method is specified for controlling a polyphase brushless electric motor, wherein the motor phase currents which are associated with the phases are produced by clocked variation of the respectively applied electrical potential. In this case, the motor phase currents flow back from the electric motor via a common return line with the peak current value in the return line being detected and being included in a controlled variable. Furthermore, a circuit configuration is specified, which is provided in a corresponding manner in order to carry out the control method. The control method and the circuit configuration allow the motor phase currents to be taken into account in the control of the electric motor in a simple and cost-effective manner.

15 Claims, 4 Drawing Sheets

U.S. PATENT DOCUMENTS

| | | | |
|---|---|---|---|
| 5,457,375 A | 10/1995 | Marcinkiewicz et al. | 318/802 |
| 5,552,685 A * | 9/1996 | Young et al. | 318/254 |
| 5,838,127 A * | 11/1998 | Young et al. | 318/293 |
| 6,028,406 A | 2/2000 | Birk | 318/254 |
| 6,111,766 A | 8/2000 | Chang et al. | 363/79 |
| 7,102,306 B2 * | 9/2006 | Hamaoka et al. | 318/254 |
| 2003/0184170 A1 | 10/2003 | Kumia et al. | 310/68 B |
| 2006/0150651 A1 * | 7/2006 | Goto et al. | 62/228.1 |

FOREIGN PATENT DOCUMENTS

| | | |
|---|---|---|
| DE | 199 35 713 A1 | 7/2000 |
| WO | WO 03/105329 A1 | 12/2003 |

OTHER PUBLICATIONS

Frede Blaabjerg et al.: "Single Current Sensor Technique in the DC Link of Three- Phase PWM-VS Inverters: A Review and a Novel Solution", XP-002412878, pp. 1241-1253, Sep./Oct. 1997.

Application Note "Digital Signal Processing Solution For Permanent Magnet Synchronous Motor", Literature No. BPR044, Texas Instruments, pp. 1-27, 1997.

* cited by examiner

FIG. 6

METHOD AND CIRCUIT CONFIGURATION FOR CONTROLLING A POLYPHASE BRUSHLESS ELECTRIC MOTOR

BACKGROUND OF THE INVENTION

Field of the Invention

The invention relates to a method for controlling a polyphase brushless electric motor, with the motor phase currents which are associated with the phases being produced by clocked variations of the respectively applied electrical potential. The invention also relates to a circuit configuration for carrying out a control method such as this.

Brushless electric motors are driven by alternate connection of their windings or coils in such a way that a rotating magnetic field is produced. The field causes a mechanical torque between the stator and the rotor of the electric motor. In order to produce the rotating magnetic field, an electric motor such as this contains at least two, and frequently three coils, which are arranged offset through an angle to one another with respect to the rotor axis. The coils and thus the rotating magnetic field are frequently associated with the stator of the electric motor.

The currents which are associated with the windings or coils of the electric motor are referred to in particular as motor phase currents. The phases of the rotating magnetic field are produced in the windings by the motor phase currents, and are added to form the overall field. If the windings of the electric motor are connected in star shape, then the currents which are measured in the supply lines correspond to the motor phase currents.

Brushless electric motors are driven by way of inverters, which provide intelligent switching between the potentials in a d.c. circuit, thus producing the desired motor phase currents. In this case, each supply line for one winding of the electric motor has an associated pair of switches or transistors which allow switching between the two potentials in the d.c. circuit. The motor phase currents which are associated with the phases are produced in this way by clocked variation of the respectively applied electrical potential.

Brushless electric motors are widely used. They can be used just as well for a hard disk drive as for vehicle propulsion. Furthermore, brushless electric motors are used in household appliances such as refrigerators and washing machines. They are also used in fans, compressors, or pumps.

In order to control a brushless electric motor, it is advantageous to know the motor phase currents. If, for example, one motor phase current exceeds a predetermined nominal value, then this can lead to overheating of the electric motor, and thus to unnecessary power consumption, or even to the destruction of the associated electronics. Furthermore, knowledge of the motor phase currents is important in order to allow the torque of the electric motor to be adjusted. Furthermore, the motor phase currents in a brushless electric motor can oscillate unless they are monitored. In this case, beating can once again result in peak values of a motor phase current, which are disadvantageous for the power consumption and the electronics.

If the motor phase currents in the respective supply lines are measured, then this disadvantageously requires a correspondingly large number of current sensors, and thus correspondingly complex evaluation electronics. Since the motor phase currents, for example if the electric motor is connected in star, are added in accordance with Kirchhoff node rule, the number of current sensors required can also be reduced, and a motor phase current that has not been measured directly can be derived from the measured motor phase currents. However, this derivation of the unmeasured motor phase current or currents disadvantageously once again necessitates corresponding complexity and increases the cost of the evaluation electronics.

In order to drive and to control a brushless electric motor, international PCT publication WO 03/105329 A1 proposes measurement of the motor phase currents by means of a single current sensor which is connected in a common return line of the motor phase currents. However, in order to allow the motor phase currents to be measured by way of the single current sensor, this disadvantageously necessitates complicated synchronization of the clocking of the electrical potential which is applied to each of the windings. Furthermore, a fast sampling device is required in order to measure the motor phase currents. The synchronization of the current sensor with the switching states is complex, and also requires expensive control units.

SUMMARY OF THE INVENTION

It is accordingly an object of the invention to provide a method and a circuit for controlling a multiphase brushless electric motor which overcome the above-mentioned disadvantages of the heretofore-known devices and methods of this general type and which allow the motor phase currents to be taken into account in a simple manner and cost-effectively. With the foregoing and other objects in view there is provided, in accordance with the invention, a method for controlling a polyphase brushless electric motor, the method which comprises:

producing motor phase currents respectively associated with the phases of the polyphase brushless electric motor by clocked variation of a respectively applied electrical potential;

conducting the motor phase currents flowing back from the electric motor via a common return line; and detecting a peak current value in the common return line and including the peak current value in a controlled variable.

In other words, for a method for controlling a polyphase brushless electric motor, with the motor phase currents which are associated with the phases being produced by clocked variation of the respectively applied electrical potential and with the motor phase currents flowing back from the electric motor via a common return line, the objects are achieved according to the invention by detecting the peak current value in the return line and by including this in a controlled variable.

A first step of the invention is in this case based on the idea that the detection of the instantaneous motor phase currents contains an unnecessarily large amount of information for control of the electric motor. By way of example, the time profile of each motor phase current is not necessarily required for control purposes. In fact, for efficiency optimization, it is sufficient to know the maximum value of a motor phase current that occurs in one period. It is thus sufficient to know the magnitude of the instantaneously greatest motor phase current for variation of the respectively applied electrical potential in each clock cycle.

Furthermore, the invention is based on the discovery that, with the normal connection of a brushless electric motor, the switching means which produce the clocking for variation of the potential are fed from a D.c. circuit. When connected in this way, the motor phase currents in the electric motor flow back via a common return line. To this extent, the current which is measured in the common return line includes an image of the individual motor phase currents.

Finally, a third step of the invention recognizes that, when the motor phase currents are produced by clocked variation of the respectively applied electrical potential, that potential connection state which introduces the respective maximum value of all the motor phase currents into the return line is also produced within a predetermined time period, which is governed by the clock. This is because the rather inert motor phase current in each case results from the individual clocked potential variations.

Once this fact has been recognized, it is accordingly sufficient to detect a peak current value in the common return line. The peak current value which is detected within a time period then corresponds to the peak value of all the motor phase currents within this time period. Since the motor phase currents are phase-shifted, the associated peak value for each motor phase current is also detected, sequentially, in this way. All that is necessary is to determine the maximum value of the currents, which are mapped in a clocked manner, in the common return line within the predetermined time period.

The described method allows a brushless electric motor wherein the motor phase currents are taken into account for control purposes to be controlled in a simple manner. If the highest value measured in the common return line is recorded as the respective peak value within a predetermined time period, then this corresponds to the respective peak value of all the motor phase currents. This can then be included in a controlled variable for the electric motor. A method such as this allows high-inertia drives, such as fans, compressors or pumps, to be operated using advantageous means for polarization identification of at least one motor phase current, without any position sensors or rotation speed sensors.

This text refers to a supply line and a return line in the d.c. circuit only to assist in the understanding of the current flow. In this notation, the peak current value in the common return line into which the motor phase currents flow back from the electric motor is detected. The peak current value can also equally well be arranged in that branch of the d.c. circuit which is referred to as the supply line. All that is necessary for this purpose is to intellectually make the change between the technical current direction and the actual current direction. The expressions supply line and return line can accordingly be interchanged as required.

The clocked variation of the electrical potential is advantageously carried out by means of pulse-width modulation. In the case of pulse-width modulation (PWM for short), the time wherein a square-wave signal at a fixed fundamental frequency is switched on and off is varied. The average applied voltage can in this way be varied for an inert load by the duration of the time for which it is switched on. If, for example, the square-wave signal is switched on for only half of the total available time, then, on average, the load sees only half of the voltage applied during the time for which it was switched on.

The PWM method is used in particular for driving brushless electric motors. In this case, by way of example, the various switching states of a switching means are maintained for different time periods within one PWM clock cycle in order to vary the potential which is applied to the motor terminals. This allows the desired phase-offset motor phase currents to be produced. Since one and the same motor phase current can be produced by different switching states, including their respective duration, it is possible to provide different drives, with their respective advantages and disadvantages.

By way of example, PWM inverters which can be driven with a PWM clock cycle of about 50-200 microseconds can be used to drive an electric motor. The inverter can assume all of the possible switching states that it can assume within one such PWM clock cycle. When a conventional three-phase electric motor is being driven, the inverter that is required in each case has two switches or transistors for each of the three supply lines, which switch the supply line backwards and forwards alternately between two potentials. Eight different switching states can be assumed by means of the total of six switches in a inverter such as this, in terms of the potential states which the three supply lines can assume. Only three or four switching states of the eight possible switching states are normally assumed during one PWM clock cycle for drive purposes. In this case, that switching state which images the instantaneously greatest motor phase current in the return line is also always chosen for a short time within one PWM clock cycle for conventional motors such as permanent-synchronous motors or induction motors.

To this extent, it is advantageous for the peak current value in the common return line in the case of pulse-width modulation to be detected within each clock cycle of the pulse-width modulation.

In one advantageous refinement of the invention, the peak current value is itself detected quantitatively. This can be achieved, for example, by storing and emitting the highest current value measured within a predetermined time period, within that predetermined time period, for example one PWM clock cycle. The respectively highest value of all motor phase currents is thus detected in each clock cycle.

In another expedient refinement of the invention, the peak current value is detected by comparing the current measured in the return path with a predetermined reference value. This can be achieved easily by using an electronic comparison component to compare the current measured within a predetermined time period with the predetermined reference value. If the current measured in the return path exceeds the predetermined reference value, a corresponding signal is emitted for control purposes. Alternatively, it is also possible to use the difference between the current measured in the return path and the predetermined reference value for control purposes.

For simple and cost-effective control, it is advantageous for the control process to start only when the measured current exceeds the reference value. This is based on the assumption that there is no need to take any control action on the electric motor when the maximum value of the current as detected within the predetermined time period is below the predetermined reference value. Appropriate control action on the electric motor takes place only when the reference value is exceeded. A control process such as this, which can be implemented using simple means, makes it possible to prevent oscillations of the motor phase currents in a simple manner, thus ensuring quiet motor running or avoiding damage to the electronics.

Even when the peak current value is measured in such a simple rather qualitative manner, it is advantageously possible by means of a comparison with a predetermined reference value to quantitatively detect the peak current value, when the reference value is adapted.

With the above and other objects in view there is also provided, in accordance with the invention, a circuit configuration for controlling a polyphase brushless electric motor having motor terminals connected to windings of the electric motor, the circuit configuration comprising:

a d.c. circuit;

a feed circuit connected in the d.c. circuit between a supply line and a return line each connectible to the the motor terminals of the windings of the electric motor, the feed circuit containing switches configured for clocked variation of the potential to be applied to each of the motor terminals;

a current sensor connected in the return line;

an evaluation circuit connected to the current sensor, for detection of a peak current value; and a control unit connected to the evaluation circuit for receiving an output value from the evaluation circuit as an input variable.

In other words, the above and other objects are also achieved, according to the invention, by a circuit configuration for controlling a polyphase brushless electric motor which has a d.c. circuit and a feed circuit which is connected in the d.c. circuit between a supply line and a return line, which can in each case be connected to the motor terminals of the windings of the electric motor, and contains switching means, with the switching means being provided for clocked variation of the potential to be applied to each of the motor terminals, and having a current sensor which is connected in the return line being provided, by means of an evaluation circuit which is connected to the current sensor, for detection of a peak current value, and a control unit which is connected to the evaluation circuit and to which an output value from the evaluation circuit is applied as an input variable.

A circuit configuration such as this makes it possible to carry out the described method for controlling a brushless electric motor, with the stated advantages. That is, the circuit may be specifically configured to carry out the above-summarized method.

The feed circuit is advantageously designed for pulse-width modulation of the potential to be applied. This is the case in particular when the feed circuit contains a PWM inverter as the switching means.

It is cost-effective for the current sensor to have a non-reactive resistor, or itself to be in the form of such a non-reactive resistor.

In one advantageous refinement, the evaluation circuit of the circuit configuration is in the form of a so-called peak-hold arrangement, which emits the detected peak current value as an output value. An arrangement such as this retains the maximum current value measured within a predetermined time period for this predetermined time period, and emits this current value after measurement. This can be achieved by simple electronic components.

In another advantageous refinement, the evaluation circuit of the circuit configuration is in the form of a comparator circuit, which compares the current measured in the return line with a reference value, and emits a trigger signal as an output value when the reference value is exceeded. A circuit such as this can be used to check whether the motor phase currents have exceeded a predetermined reference value, easily and in a cost-effective manner. If appropriate control action is taken, this makes it possible to avoid oscillation of the motor phase currents and damage to the electronics for the electric motor caused by excessively high motor phase currents.

If pulse-width modulation is used to drive the electric motor, then it is advantageous for the evaluation circuit to be designed to detect the peak current value within each clock cycle of the pulse-width modulation. As mentioned, that switching state which corresponds to the respective highest value of all the motor phase currents is also assumed for a short time within one PWM clock cycle when a brushless electric motor is being driven in the normal manner.

Other features which are considered as characteristic for the invention are set forth in the appended claims.

Although the invention is illustrated and described herein as embodied in a method and circuit configuration for controlling a polyphase brushless electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
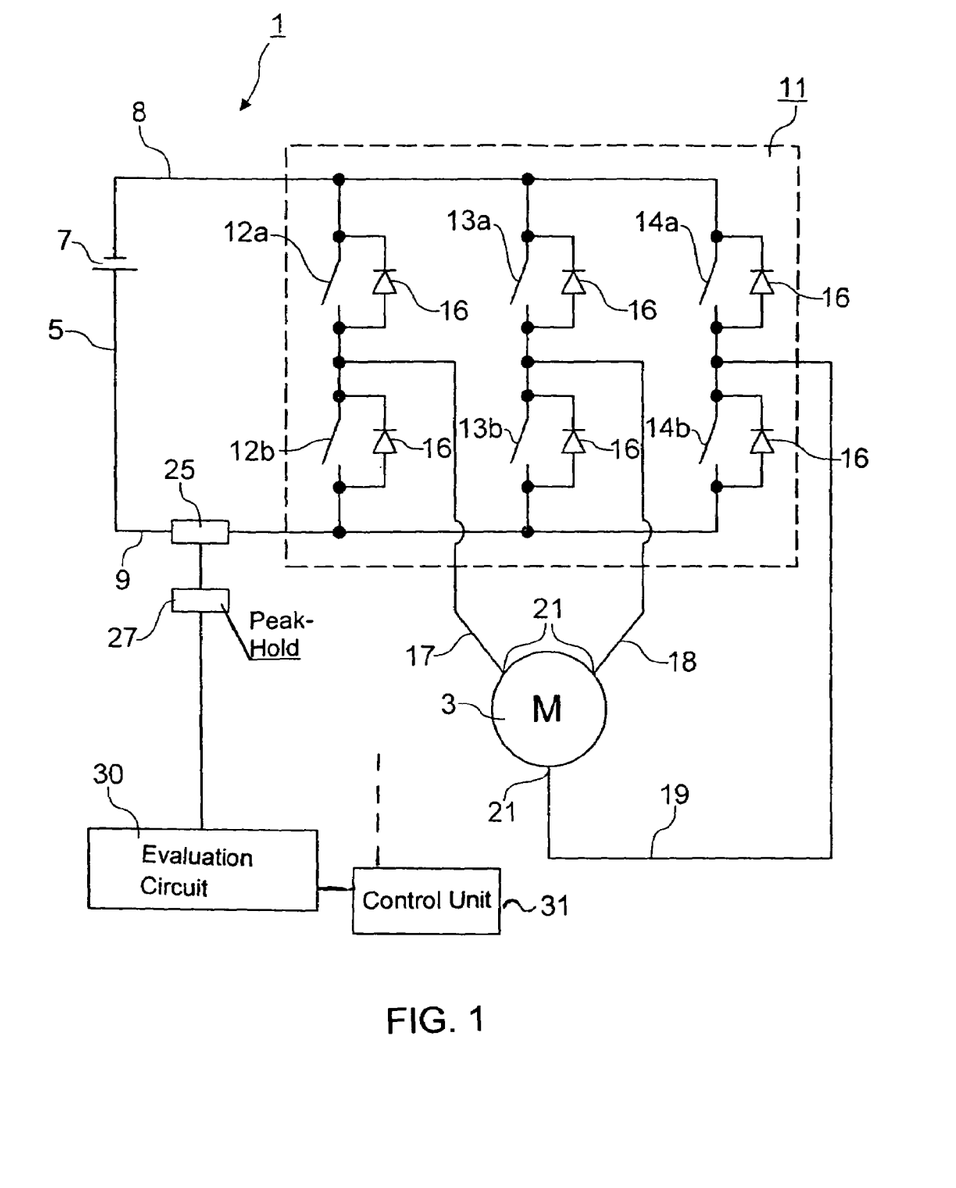
FIG. 1 is a block schematic of a circuit configuration for controlling a brushless electric motor, with a current sensor having a peak-hold device connected to it disposed in a common return line for the motor phase currents.

Referring now to the figures of the drawing in detail and first, particularly, to FIG. 1 thereof, there is shown a circuit configuration 1 for driving a brushless three-phase electric motor 3. The circuit configuration 1 for this purpose has a d.c. circuit 5 with a source of emf or a direct current source 7. An inverter 11 is connected between a supply line 8 and a return line 9, for the clocked variation of the electrical potential to be applied to the electric motor 3.

The pulse-width-modulated inverter 11 in each case has pairs of switches 12a, 12b as well as 13a, 13b and 14a, 14b, which are in the form of transistors. Each individual one of these switches 12a, 12b, 13a, 13b, 14a, 14b is bridged by freewheeling diodes 16 which are forward-biased in the current flow direction. A first supply line 17, a second supply line 18, and a third supply line 19, respectively, are connected between the respective switch pairs 12a, 12b as well as 13a, 13b and 14a, 14b. These supply lines are connected to the three motor terminals 21 of the electric motor 3.

When the switches 12a, 13a and 14a are closed, then the corresponding motor terminals 21 are each connected to a high potential via the supply lines 17, 18 and 19, respectively. The motor terminals 21 are each connected to a low potential by closing the switches 12b, 13b and 14b. The total of six switches 12a, 12b, 13a, 13b, 14a, 14b can be used to achieve a total of eight switching states, wherein each of the terminals 21 is connected either to the "high" potential or the "low" potential. In six of these switching states, one of the terminals 21 is in each case connected to a different potential to that on the other two terminals 21. In the remaining two switching states, all of the terminals 21 are at the "high" potential or "low" potential.

Appropriate modulation of the eight switching states results in a rotating magnetic field being formed in the brushless electric motor 3, causing the rotor of the electric motor 3 to carry out a mechanical rotary movement.

The motor phase currents which are associated with the respective supply lines 17, 18 and 19 flow back into the electric motor 3 via the common return line 9. The highest current value measured within one PWM clock cycle is in each case detected, for this PWM clock cycle, by means of a current sensor 25 connected in the return line 9. This is done by way of a peak-hold circuit 27, whose output leads to an evaluation circuit 30. The evaluation circuit 30 is connected to a control unit 31 for control of the circuit configuration 11 in closed-loop or open-loop mode.

The inverter 11 is driven by a PWM (pulse width modulation) clock with a duration of between 50 and 200 microseconds (µs). This corresponds to a frequency of between 5 and 20 kHz, the latter value of which is outside the human hearing range. The electric motor 3 is driven within each clock cycle by assumption of four of the possible eight switching states of the inverter 11. This high-frequency switching of the individual switching states of the inverter 11 results in the current which is measured in the return line 9 by means of the current sensor 25 changing suddenly, with a high dynamic response. The highest current value which is in each case measured within one PWM clock cycle is retained by means of the peak-hold device 27 for one PWM clock cycle. This is appropriate, since that switching state which corresponds to the highest current value of all the motor phase currents, the respective peak current value of all the motor phase currents, is always assumed for a short time period within one PWM clock cycle. This peak current value is used by the evaluation circuit 30 to control the circuit configuration 1 and thus the electric motor 3.

Figure 2:
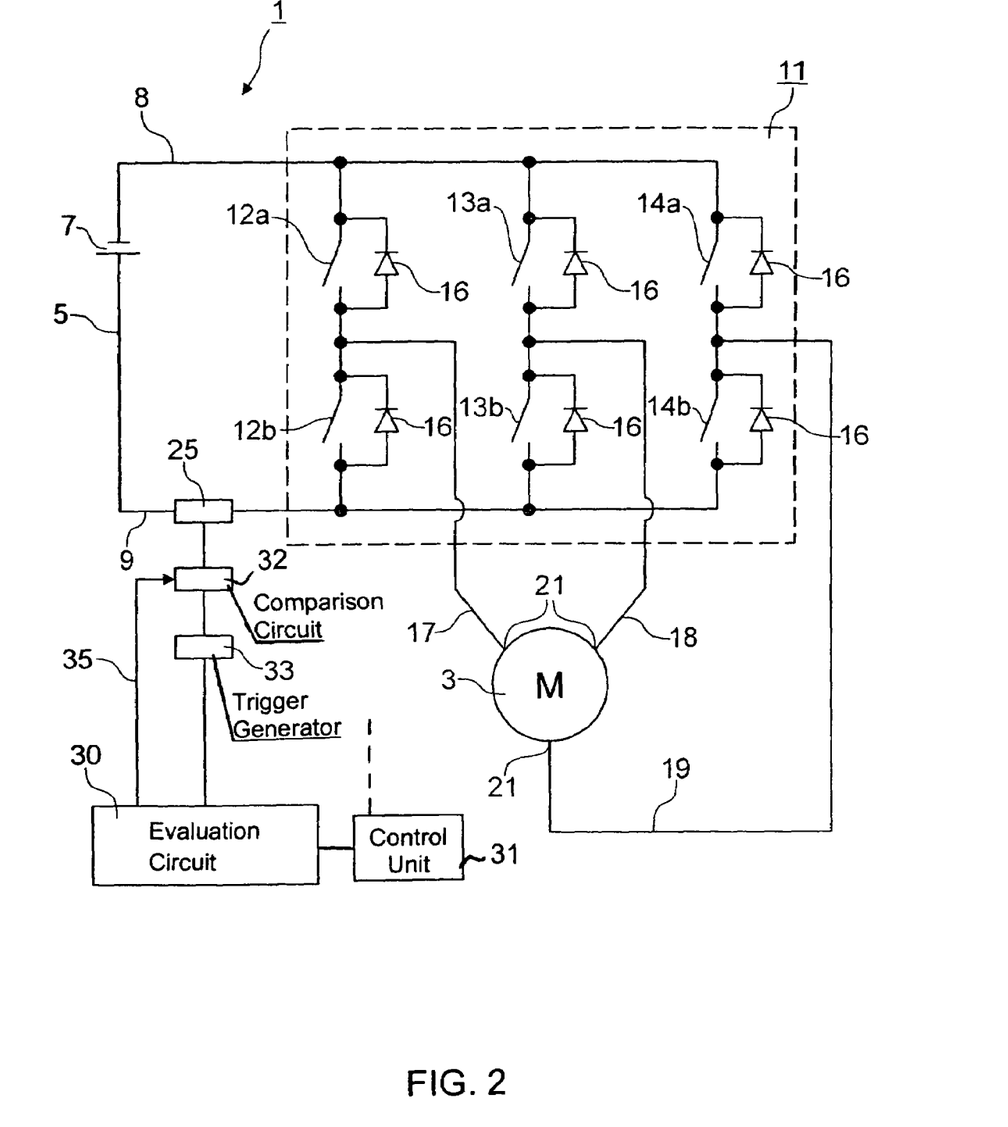
FIG. 2 is a block schematic similar to that of FIG. 1, but with a comparator circuit for comparison of the measured current with a reference value being disposed on the current sensor which is connected in the common return line.

FIG. 2 shows a substantially identical circuit configuration 11 to that shown in FIG. 1. In this case, however, a comparison circuit 32, and a trigger generator 33 connected to it, are connected to the current sensor 25 which is arranged in the return line 9. The output of the trigger generator 33 is connected to the evaluation circuit 30. The evaluation circuit 30 presets a reference value via a signal line 35.

The respectively measured currents within one PWM clock cycle are compared by means of the comparison circuit 32 with the predetermined reference value. If the measured current exceeds the reference value, then the comparison circuit emits an output signal, which causes the trigger generator 33 to respond. This in turn sends an appropriate output signal to the evaluation circuit 30, which is connected to a control unit for closed-loop or open-loop control of the circuit configuration 11.

The circuit configuration 11 illustrated in FIG. 2 is used to control the electric motor 3 if the motor phase currents exceed a predetermined reference value. This reliably avoids oscillation of the motor phase currents, and thus damage to the electronics.

Figure 3:
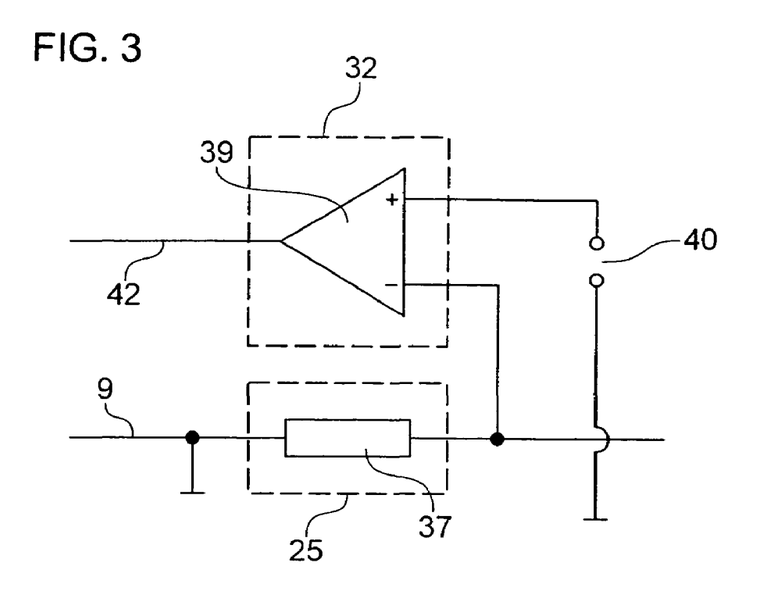
FIG. 3 is a circuit schematic of a circuit configuration for a comparator circuit.

FIG. 3 shows a circuit configuration for evaluation of the current measured in the return line, corresponding to the circuit configuration 1 in FIG. 2. In this case, the current sensor 25 which is arranged in the return line 9 is in the form of a non-reactive resistor 37. The voltage which is dropped across the non-reactive resistor 37 and is a measure of the measured current is compared by means of the comparison circuit 32 with a predetermined nominal value. For this purpose, a comparator 39 compares the voltage which is dropped across the non-reactive resistor 37 with a predetermined reference voltage 40, which corresponds to a maximum peak current value, which can be set.

If the voltage drop across the non-reactive resistor 37 exceeds the value of the predetermined reference voltage 40, then the output signal 42 from the comparator 39 changes to low. Low states such as these may have a short duration, in particular of one microsecond, because the switching states of the inverter 11 change at high frequency.

Figure 4:
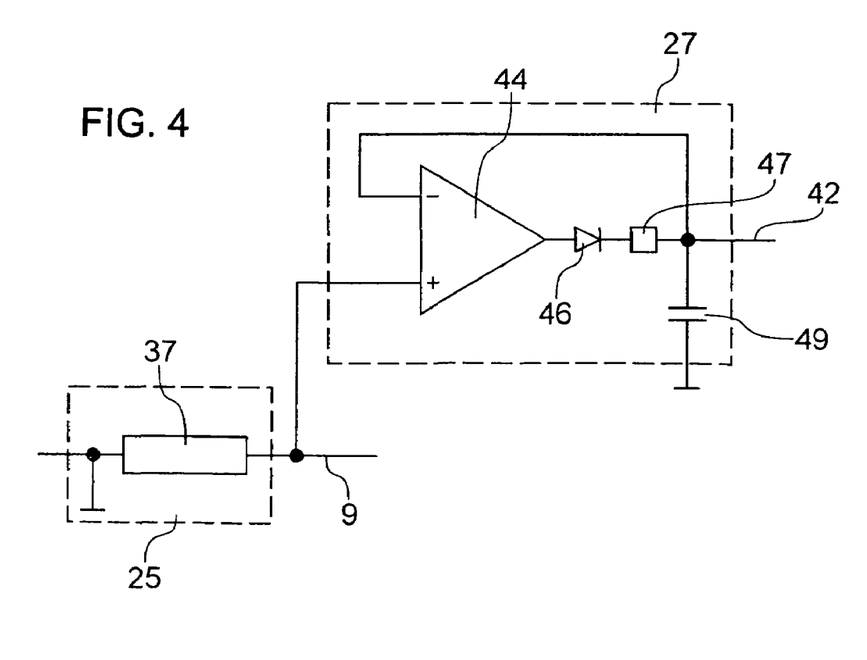
FIG. 4 is a circuit schematic of a circuit configuration of a peak-hold device.

FIG. 4 shows a circuit configuration for a peak-hold device 27 based on the circuit configuration 1 in FIG. 1. The current sensor 25 is in this case once again in the form of a non-reactive resistor 37. The peak-hold device 27 in this case is in the form of a comparator 44, to whose output side a diode 46 and a non-reactive resistor 47 are connected. In this case, the voltage which is dropped across the non-reactive resistor 37 is detected via the positive input of the comparator 44, while the negative input of the comparator 44 is fed back by means of a capacitor which maintains the output voltage of the comparator 44.

The charge which is stored in the capacitor 49 corresponds for a predetermined time period to the maximum current value measured during the time period.

Corresponding to the circuit configuration 1 shown in FIG. 1, the evaluation circuit 30 evaluates the output value of the peak-hold device 27 after at least one cycle of the pulse-width modulation, and resets the peak-hold device 27 again. This is done by measuring the potential on the output line 42, which is then digitally converted for further assessment. The capacitor 49 is then discharged to earth by brief clamping.

Figure 5:
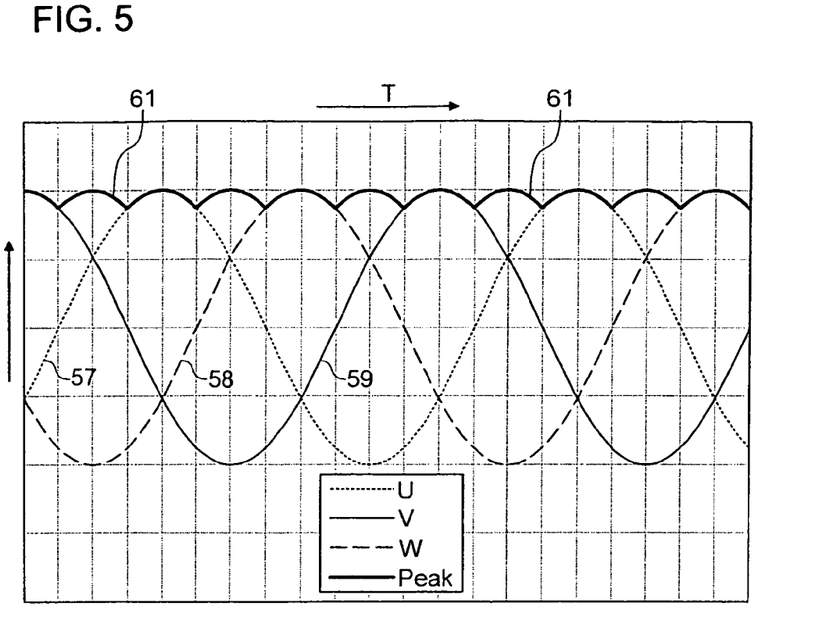
FIG. 5 is a time profile graph of the motor phase currents for a three-phase electric motor.

FIG. 5 shows the profile of the phase-offset motor phase currents 57, 58, 59 in order to assist understanding of a brushless three-phase electric motor. In the illustrated graph, the time T is plotted on the abscissa, and the current I is plotted on the ordinate. This clearly shows the sinusoidal profile of the three motor phase currents 57, 58, 59.

Each individual one of the illustrated motor phase currents 57, 58, 59 is produced alternately by PWM clocking of the inverter 11 in accordance with the circuit configurations 1 shown in FIG. 1 or 2. In this case, a PWM period is shorter by a factor of about 100 than a period of the illustrated current profile.

Since that switching state which corresponds to the highest current value of all the motor phase currents always occurs for a short time during one PWM clock cycle, the peak current value of all the motor phase currents within one PWM clock cycle is always measured as the maximum value of the currents measured in this PWM clock cycle by means of the current sensor 25 which is arranged in the return line 9 (see FIGS. 1 and 2). To this extent, the peak current value of the three motor phase currents 57, 58, 59 is in each case determined from the measurement of the respective maximum current during one PWM clock cycle. Since the current which is flowing in the return line 9 always flows in the same direction, the peak current value of all the motor phase currents with the greatest magnitude during one PWM clock cycle is thus measured. When the maximum current value is detected in this way during one PWM clock cycle this therefore results in the profile shown in FIG. 5 for the magnitude of the peak current value 61 of all the motor phase currents 57, 58, 59. This peak current value 61 is included in a controlled variable for controlling the control circuit 1 as shown in FIG. 1 or 2.

Figure 6:
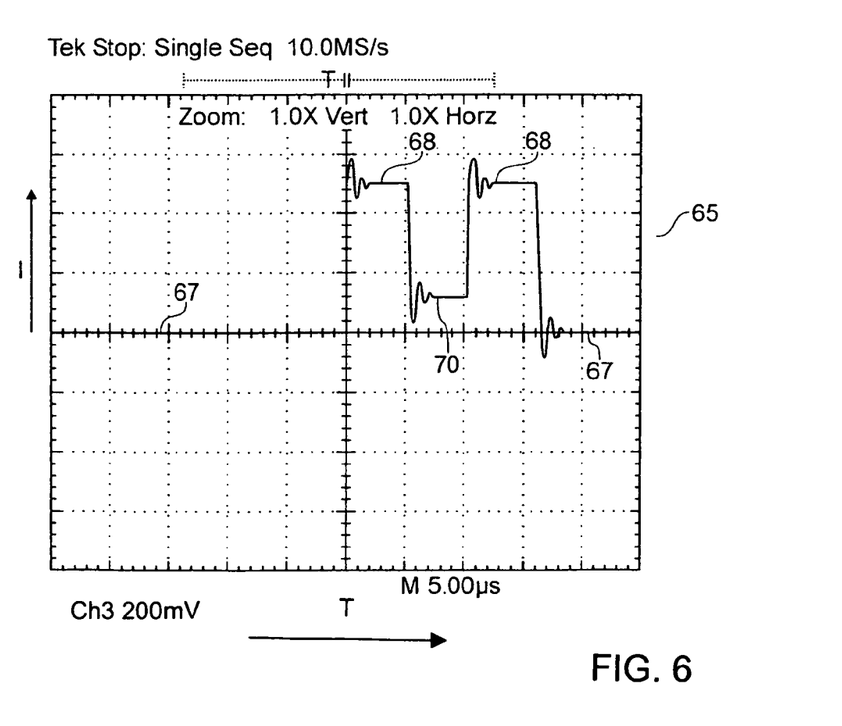
FIG. 6 is a current profile for a PWM drive for an electric motor as measured within one PWM clock cycle on the common return line, based on circuit configurations 1 or 2.

Finally, FIG. 6 shows the current measured for one PWM clock cycle 65 by means of the current sensor 25 which is connected in the return line 9 of the circuit configurations shown in FIG. 1 and FIG. 2. In this case, the time T is once again plotted on the abscissa, and the current I is plotted on the ordinate. The illustrated PWM clock cycle covers a total of fifty microseconds. The illustrated subdivision thus corresponds to five microseconds in each case.

During the first 25 microseconds, the inverter 11 assumes a switching state 67, wherein no current is flowing in the return line 9. This may either be the switching state wherein all of the switches 12a, 13a, 14a or all of the switches 12b, 13b, 14b are closed. During approximately the next five microseconds, a switching state 68 is assumed, wherein, for example, the motor phase current 58 has a negative value. A switching state 70 is then assumed for five microseconds, wherein, for example, the motor phase current 57 has a positive value, in order subsequently to change to the switching state 68 again for five microseconds. The PWM period 65 is once again completed by the switching state 67, wherein all of the terminals 21 of the electric motor 3 are at the same potential.

This application claims the priority, under 35 U.S.C. § 119, of German patent application No. DE 10 2005 005 404.8, filed Feb. 5, 2005 and German patent application No. DE 10 2005 028 344.6, filed Jun. 18, 2005; the prior applications are herewith incorporated by reference in their entirety.

We claim:

1. A method for controlling a polyphase brushless electric motor, the method which comprises:
   producing motor three-phase sinusoidal currents respectively associated with the phases of the polyphase brushless electric motor by clocked variation of a respectively applied electrical potential;
   supplying continuously all of said three-phase sinusoidal currents to the phases of the polyphase brushless electric motor;
   conducting the motor three-phase sinusoidal currents flowing back from the electric motor via a common return line; and
   detecting a peak current value in the common return line and including the peak current value in a controlled variable.

2. The method according to claim 1, which comprises effecting the clocked variation of the electrical potential by way of pulse-width modulation.

3. The method according to claim 2, wherein the detecting step comprises detecting the peak current value within each clock cycle of the pulse-width modulation.

4. The method according to claim 1, wherein the detecting step comprises detecting the peak current value quantitatively.

5. The method according to claim 1, which further comprises comparing the current measured in the return line with a predetermined reference value.

6. The method according to claim 5, which comprises starting a control process when a value of the current measured in the return line exceeds the reference value.

7. The method according to claim 5, which comprises detecting the peak current value quantitatively by variation of the reference value.

8. A circuit configuration for controlling a polyphase brushless electric motor having motor terminals connected to windings of the electric motor, the circuit configuration comprising:
   a d.c. circuit;
   a feed circuit connected in said d.c. circuit between a supply line and a return line each connectible to the motor terminals of the windings of the electric motor, said feed circuit containing switches configured for clocked variation of the potential to be applied to each of the motor terminals, said feed circuit generating three-phase sinusoidal currents and continuously supplying all of the three-phase sinusoidal currents to the windings of the electric motor;
   a current sensor connected in said return line;
   an evaluation circuit connected to said current sensor, for detection of a peak current value; and
   a control unit connected to said evaluation circuit for receiving an output value from said evaluation circuit as an input variable and generating a control variable based on the peak current value.

9. The circuit configuration according to claim 8, wherein said feed circuit is configured for pulse-width modulation of a potential to be applied.

10. The circuit configuration according to claim 8, wherein said switches in said feed circuit form a pulse width modulating inverter.

11. The circuit configuration according to claim 8, wherein said current sensor has a non-reactive resistor.

12. The circuit configuration according to claim 8, wherein said evaluation circuit is a peak-hold configuration outputting a detected peak current value as an output value.

13. The circuit configuration according to claim 8, wherein said evaluation circuit is a comparison circuit configured to compare the current measured in said return line with a reference value, and to output a trigger signal as an output value when the reference value is exceeded by a value of the current measured in said return line.

14. The circuit configuration according to claim 9, wherein said evaluation circuit is configured to detect the peak current value within each clock cycle of the pulse-width modulation.

15. The circuit configuration according to claim 8 configured to carry out the method according to claim 1.

* * * * *